(12) United States Patent
Robillard

(10) Patent No.: US 6,860,336 B2
(45) Date of Patent: Mar. 1, 2005

(54) SUBSOIL FERTILIZER APPLICATOR

(75) Inventor: Jerome Robillard, Salina, KS (US)

(73) Assignee: Great Plains Manufacturing, Incorporated, Salina, KS (US)

( * ) Notice: Subject to any disclaimer, the term of this patent is extended or adjusted under 35 U.S.C. 154(b) by 58 days.

(21) Appl. No.: 10/372,441

(22) Filed: Feb. 21, 2003

(65) Prior Publication Data
US 2004/0187753 A1 Sep. 30, 2004

(51) Int. Cl.[7] .............................. A01B 13/10; A01C 7/06
(52) U.S. Cl. ....................... 172/724; 172/699; 172/730; 111/123; 111/124; 111/111
(58) Field of Search ................... 111/123, 124, 111/152, 149; 172/722, 724, 725, 730, 699, 193

(56) References Cited

U.S. PATENT DOCUMENTS

| | | | | |
|---|---|---|---|---|
| 3,038,424 A | * | 6/1962 | Johnson ...................... | 111/124 |
| 3,919,951 A | * | 11/1975 | Williams et al. ............ | 111/123 |
| 4,033,271 A | * | 7/1977 | Williams et al. ............ | 111/123 |
| 4,770,112 A | * | 9/1988 | Neumeyer .................... | 111/73 |
| 4,773,340 A | * | 9/1988 | Williams et al. ............ | 111/124 |
| 5,333,559 A | * | 8/1994 | Hodapp et al. ............. | 111/152 |
| 5,495,814 A | * | 3/1996 | Primus ........................ | 111/124 |
| 6,182,587 B1 | * | 2/2001 | Lempriere ................... | 111/124 |
| 6,302,040 B2 | * | 10/2001 | Lempriere ................... | 111/124 |
| 6,397,767 B1 | * | 6/2002 | Dietrich, Sr. ............... | 111/119 |
| 6,405,665 B1 | * | 6/2002 | Henry et al. ................ | 111/152 |
| 6,640,731 B1 | * | 11/2003 | Rowlett et al. ............. | 111/152 |

* cited by examiner

Primary Examiner—Thomas B. Will
Assistant Examiner—Alexandra K. Pechhold
(74) Attorney, Agent, or Firm—Hovey Williams LLP

(57) ABSTRACT

A subsoil applicator has an upright shank provided with a leading soil-slicing edge and a pair of opposite sides. At the bottom of the shank, a pair of soil lifting wings are provided, presenting a pair of outermost wing edges that diverge rearwardly from the lowermost and forwardmost point of the shank to the rear extremity of the applicator. The wings are generally relatively thin and flat except for a thickened portion across their rear extremity making an upright, rearwardly facing rear wall. A pair of laterally spaced discharge outlets are located in the rear wall and communicate with an internal tubular passage within the shank for delivering substance down into the soil behind the wall as the applicator advances through the soil. The discharge outlets are located in undercut portions of the rear wall, while top, upwardly facing surfaces of the thickened portion are convexly curved to improve soil flow and provide extra protection against premature wear for the internal substance passageways.

9 Claims, 3 Drawing Sheets

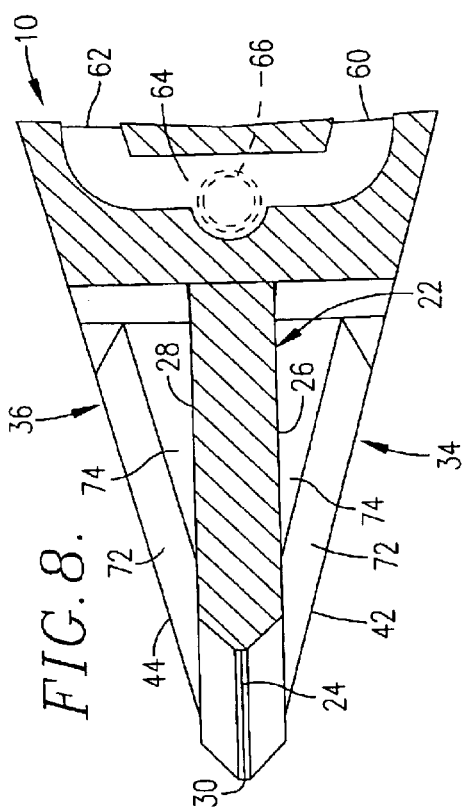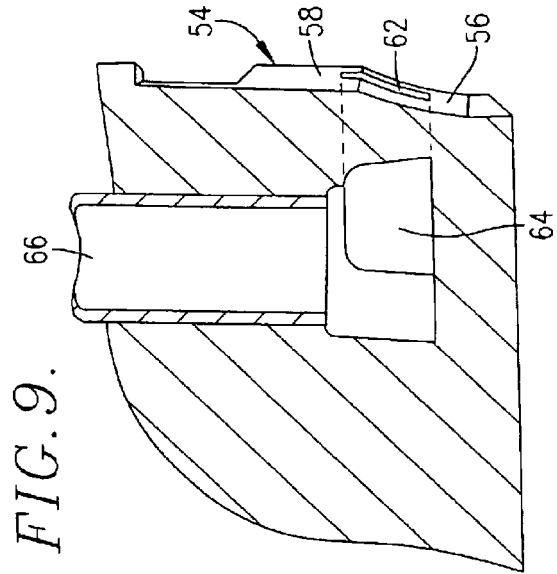

SUBSOIL FERTILIZER APPLICATOR

TECHNICAL FIELD

This invention relates to tillage equipment and, more particularly, to a subsoil applicator which may be used to apply starter fertilizer or the like at the same time it opens a seed furrow for accepting seeds from a trailing planter opener.

BACKGROUND AND SUMMARY

It is known in the art to cut a seed furrow with an upright shank or knife and simultaneously fluff the furrow sidewalls with laterally projecting wings while placing fertilizer in an offset manner along the seed line of the furrow. See for example U.S. Pat. No. 5,495,814 to David R. Primus titled Sub-zone Tiller with Offset Fertilizer Placement.

However, in the Primus tiller fertilizer is applied through a transversely extending cross tube at the rear of the device that has a pair of discharge openings at its opposite ends. In some soil conditions, these openings can become plugged, making it difficult to accurately and consistently apply proper amounts of fertilizer. Moreover, the discharge tube is exposed to wear from abrasive soil, which shortens its useful life. In addition, an upwardly inclined rear portion on the wings just ahead of the discharge tube does not provide the optimum soil flow and lifting action as the unit moves through the subsoil, and such portion is subject to premature wear.

The present invention provides a subsoil applicator and furrow loosening device that minimizes the opportunities for plugging the discharge outlets and reduces the opportunities for premature wear of the fertilizer delivery structure. It also enhances soil flow and achieves improved loosening or fluffing action while at the same time having greater resistance to premature wear.

In one preferred embodiment of the invention, the applicator has the fertilizer delivery structure housed internally within the shank and wings of the device, with the wings having laterally offset and rearwardly facing discharge outlets through which the fertilizer passes out of the device and into the soil. A thickened rear portion of the wings presents a generally upright rear wall within which the discharge outlets are disposed. The rear wall has an upper overhanging portion and a lower undercut portion to present a recess, the outlets being disposed primarily in such recess so as to reduce clogging and encourage free discharge of fertilizer from the unit.

The thickened rear portion of the wings also presents a transversely extending rearmost boss that is raised with respect to forward portions of the wings. Each boss has a convexly curved, generally upwardly facing top surface that promotes streamlined soil flow and increases the wear characteristics of the wings, particularly in the critical rear portions thereof where the tubular fertilizer passages are located.

BRIEF DESCRIPTION OF THE DRAWINGS

FIG. 6 is a top plan view of the applicator;

FIG. 7 is a horizontal cross-sectional view of the applicator taken substantially along line 7—7 of FIG. 3;

FIG. 8 is a horizontal cross-sectional view of the applicator taken substantially along line 8—8 of FIG. 3; and FIG. 9 is an enlarged, fragmentary cross-sectional view through the rear of the applicator taken substantially along line 9—9 of FIG. 5.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
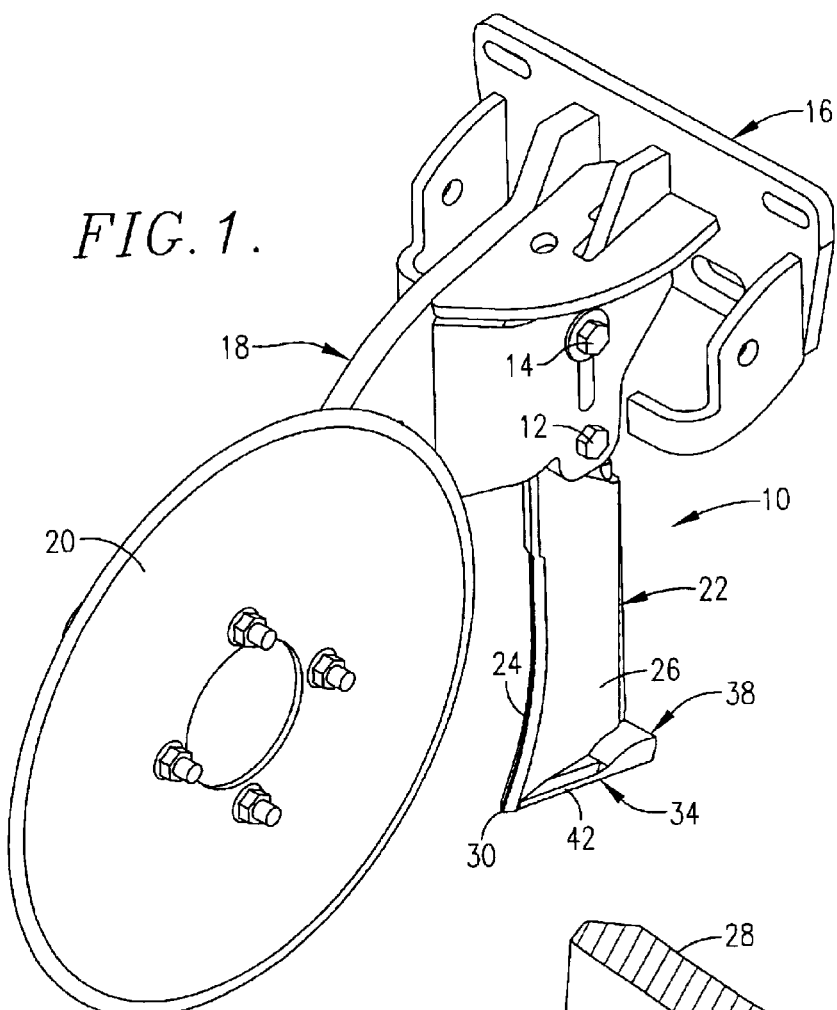
FIG. 1 is a left front isometric view of a subsoil applicator in accordance with the present invention secured to a mounting bracket for attachment to a planter opener and disposed in trailing relationship to a trash-cutting coulter.
Figure 2:
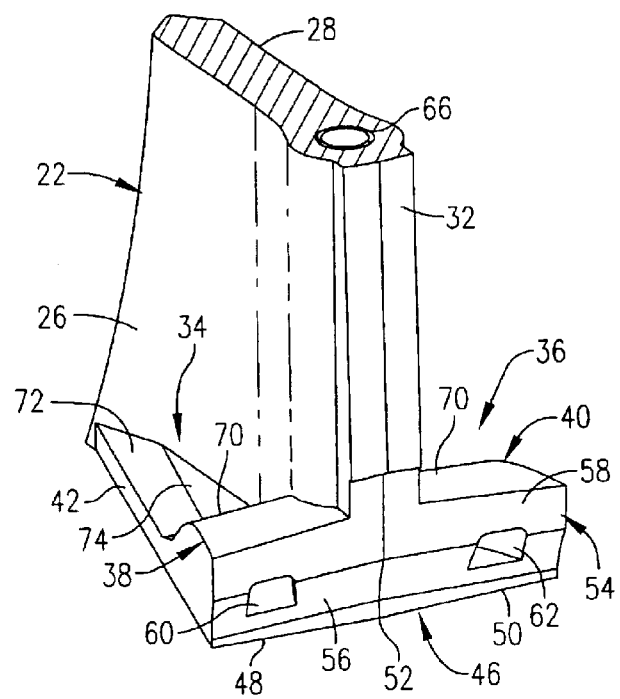
FIG. 2 is an enlarged, fragmentary left rear isometric view of the applicator.
Figure 4:
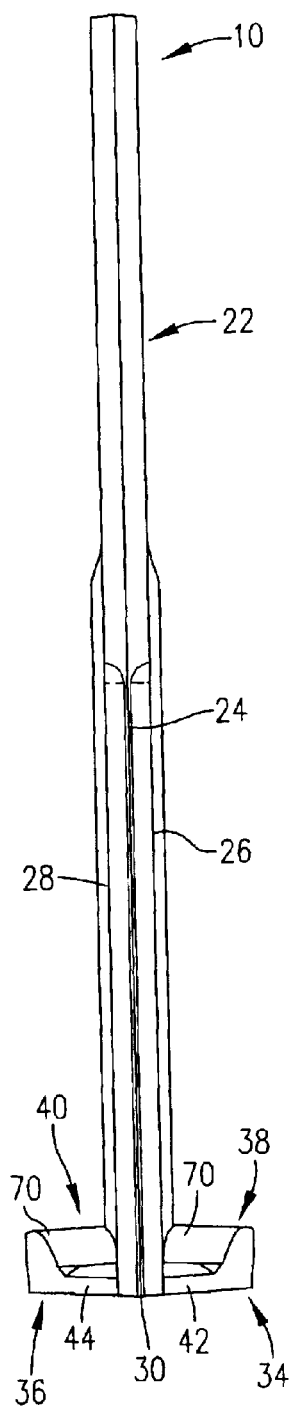
FIG. 4 is a front elevational view of the applicator.
Figure 3:
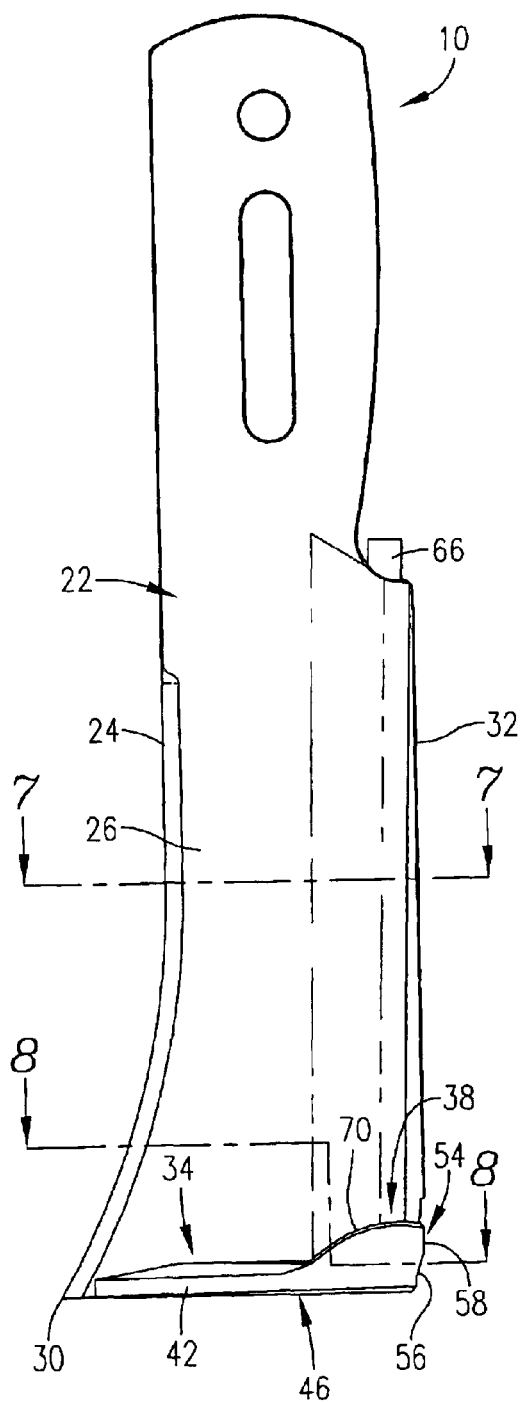
FIG. 3 is a left side elevational view of the applicator.
Figure 5:
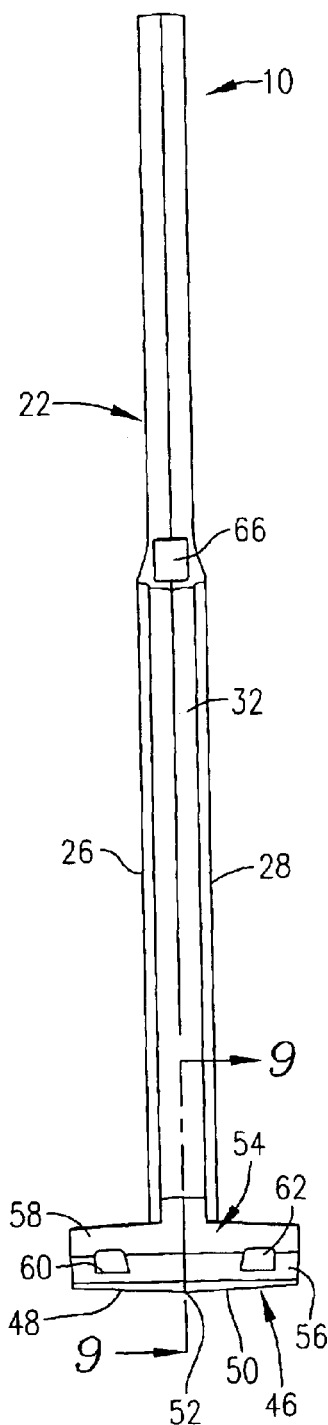
FIG. 5 is a rear elevational view of the applicator.

With initial reference to FIG. 1, the applicator 10 is shown attached by bolts 12 and 14 to a mounting bracket broadly denoted by the numeral 16 which is adapted to be secured to the front of a planter opener (not shown) so that applicator 10 moves along directly in front of the opening device that is depositing seeds into the soil. Also secured to bracket 16 by welding or otherwise is a coulter wheel assembly 18 including a coulter 20 positioned in direct frontal alignment with applicator 10 for cutting through trash during field operations and facilitating entry of applicator 10 into the soil. Coulter 20 also serves to protect applicator 10 from obstacles such as rocks and the like in the field because, when coulter 20 encounters such an obstacle, coulter 20 rides up and over the obstacle, lifting the entire opener and applicator 10 over the obstacle as well. Optionally, one or more row cleaners (not shown) may also be used immediately ahead of coulter 20 such as, for example, row cleaners of the type disclosed in U.S. Pat. No. 5,657,707 owned by the assignee of the present invention.

It will be appreciated that applicator 10 may be used in a variety of different ways without departing from the principles of the present invention and that the particular arrangement illustrated in FIG. 1 is for purposes of example only and not for limiting the scope of the invention. Although applicator 10 could be used by itself without associated planting mechanism, it is contemplated that in most instances it will be used in combination with planting equipment close-coupled immediately therebehind, or at least a short distance therebehind, such that the furrow opened by coulter 20 and applicator 10 is the same furrow utilized for the placement of seed by the trailing planting equipment. Prior U.S. Pat. No. 5,495,814 is here by incorporated by reference into the present specification as a disclosure of that type of arrangement.

With reference more particularly now to FIGS. 2–9, applicator 10 includes a generally flat, upright, thin shank 22 having a beveled leading edge 24 that is itself generally upright. Shank 22 also includes a left side 26 and a right side 28. In its lower portion, leading edge 24 is slightly rearwardly concave and terminates in a lowermost and forwardmost point 30. Edge 24 serves to slice through the soil, widening the slit made by coulter 20, which is widened somewhat further by the sides 26 and 28 of shank 22 behind edge 24. A rear edge 32 of shank 22 is essentially upright and flat.

Applicator 10 also has a pair of left and right wings 34 and 36 respectively that serve to lift and fluff the soil of the furrow as the applicator moves along. Wings 34,36 are generally thin and flat, except that they have a thickened portion across their rear extremity that is formed by a pair of bosses 38 and 40 projecting outwardly from opposites sides 26 and 28. The wings 34, 36 present a pair of side edges 42 and 44 that diverge rearwardly from leading edge 24 at point 30 and terminate at the rearmost extremity of the applicator such that the overall shape of wings 34, 36 is generally in the shape of an arrowhead as viewed in plan. It will be appreciated that bosses 38 and 40 extend transversely outwardly from their respective sides 26, 28 to the respective side edges 42 and 44 of wings 34, 36.

Wings 34, 36 are joined together across the bottom of applicator 10 so as to present a continuous, generally triangular-shaped bottom 46. Bottom 46 has two left and right portions 48 and 50 that slope downwardly and centrally to a fore-and-aft, centermost keel 52 aligned with point 30. It will be appreciated that point 30 and keel 52 thus define the center of the furrow and also the seed line for seeds that are being ultimately deposited in the furrow by the trailing planter.

The thickened portion across the rear of the applicator defined by bosses 38 and 40 presents an upwardly extending, rearwardly facing rear wall 54. Rear wall 54 is undercut across its lower half to present a lower undercut portion 56 and an upper overhanging portion 58. It will be appreciated that by this relationship, a recess is defined across the rear wall 58 below overhanging portion 58 and immediately to the rear of undercut portion 56. Preferably, undercut portion 56 is slightly concave.

Rear wall 54 has a pair of laterally spaced discharge outlets 60 and 62 therein, both of which are preferably primarily disposed within the undercut portion 56. Outlets 60 and 62 are offset laterally from and on opposite sides of the seed line defined by keel 52 by a substantial distance such that fertilizer issuing from outlets 60 and 62 is correspondingly offset from the seed line.

As illustrated particularly in FIGS. 8 and 9, outlets 60,62 are interconnected internally of bosses 38,40 via a common chamber or manifold 64, which in turn communicates with an upright supply tube 66 that is preferably cast in place internally within the body of shank 22 forwardly of rear edge 32. The upper end of tube 66 is adapted to be connected to a suitable hose or the like (not shown) leading to a source of supply of fertilizer.or the like to be applied. Thus, outlets 60, 62, chamber 64 and tube 66 all comprise what may be broadly termed tubular structure for supplying substances to the soil behind rear wall 54.

Each of the bosses 38, 40 presents a generally upwardly facing concave top surface 70 extending laterally outwardly from the corresponding shank side 26 or 28 to the corresponding wing side edge 42 or 44. Convex top surface 70 also extends from a forwardmost point generally at the beginning of the thick portion of boss 38 or 40 to rear wall 54. Forwardly of convex top surface 70, each wing 34 and 36 is generally flat and much thinner than the thick boss portions 38 and 40, except that there is a slight laterally outwardly extending bevel or chamfer 72 leading from the corresponding side edge 42 or 44 inwardly to the corresponding shank side 26 or 28 and a level triangular region 74 of the corresponding wing.

It will be appreciated that as applicator 10 moves through the soil, leading edge 24 widens the slice made by leading coulter 20, in the event that such coulter is being used. Otherwise, leading edge 24 makes the initial contact with the frontal soil boundary and commences a vertical slice in the soil, which is widened slightly as the body of shank 22 then passes through that area. Point 30 and keel 52 establish the seed line or root of the furrow that is thus produced, while wings 34 and 36 fluff and lift the side margins of the furrow to produce a tilthy condition in that area.

As the thickened rear portion of the wings presented by bosses 38 and 40 moves through the soil, the soil flows up and over such areas so as to tend to leave a void immediately behind rear wall 54, particularly in the recess that is created immediately behind undercut portion 56. Thus, fertilizer and other substances being discharged through outlet 60 and 62 are relatively unhindered as they flow outwardly and rearwardly in offset paths or lines with respect to the seed deposit line. Moreover, the outlets 60 and 62 are essentially protected from being plugged and clogged by soil due to their rearward facing orientations and their slightly recessed, protected positions underneath overhanging portion 58.

It will be appreciated also that the tubular passages through which the substance is delivered to the soil are themselves all well protected against wear from the soil due to their internal disposition within the body of the applicator. No part of such tubular structure is exposed until the upper tip of tube 66 presents itself, which is well above the soil line.

Furthermore, the convexly curved nature of top surface 70 improves soil flow in this critical area of the discharge outlets 60, 62. It also provides an additional measure of material thickness in the critical areas near the tubular passages so as to guard against premature rupture of such passageways due to wear from prolonged soil contact.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A subsoil applicator comprising:

an upright shank having a leading, generally upright edge and a pair of opposite sides extending rearwardly from said leading edge;

a pair of wings adjacent the lower end of said shank projecting laterally outwardly from opposite sides of the shank, said wings presenting a pair of laterally outermost edges that diverge rearwardly from the leading edge of the shank to a transversely extending rear extremity of each wing, each of said wings having an upwardly projecting boss extending along and disposed forwardly adjacent its rear extremity, said boss having a generally upwardly facing, convexly upper surface that extends outwardly from the corresponding side of the shank to the outermost edge of the corresponding wing; and tubular structure for discharging a substance into the subsoil behind the rear extremity of the wings.

2. A subsoil applicator as claimed in claim 1, said wings having a rearwardly facing rear wall extending across the rear of the applicator and interconnecting said outermost edges of the wings, said tubular structure including rearwardly facing discharge outlets in said rear wall.

3. A subsoil applicator as claimed in claim 2, said rear wall including an upper overhanging portion and a lower undercut portion to define a lower transverse recess across the rear of the applicator, said discharge outlets being located in said undercut portion.

4. A subsoil applicator comprising:

an upright shank having a leading, generally unright edge and a pair of opposite sides extending rearwardly from said leading edge;

a pair of wings adjacent the lower end of said shank projecting laterally outwardly from opposite sides of the shank, said wings presenting a pair of laterally outermost edges that diverge rearwardly from the leading edge of the shank to a transversely extending rear extremity of each wing, each of said wings having an upwardly projecting boss extending along and disposed forwardly adjacent its rear extremity, said boss having a generally upwardly facing convex upper surface that extends outwardly from the corresponding side of the shank to the outermost edge of the corresponding wing; and tubular structure for discharging a substance into the subsoil behind the rear extremity of the wings, said wings having a rearwardly facing rear wall extending across the rear of the applicator and interconnecting said outermost edges of the wings, said tubular structure including rearwardly facing discharge outlets in said rear wall, said shank further including a generally upright rear edge, said tubular structure further including an upright, internal passage in said shank forward of said rear edge and communicating with said discharge outlets.

5. A subsoil applicator as claimed in claim 4, said rear wall including an upper overhanging portion and a lower undercut portion to define a lower transverse recess across the rear of the applicator, said discharge outlets being located in said undercut portion.

6. A subsoil applicator comprising:

an upright shank having a leading, generally upright edge and a pair of opposite sides extending rearwardly from said leading edge;

a pair of wings adjacent the lower end of said shank projecting laterally outwardly from opposite sides of the shank, said wings presenting a pair of laterally outermost edges that diverge rearwardly from the leading edge of the shank to a rearwardly facing rear wall extending across the rear of the applicator and interconnecting said outermost edges of the wings, said rear wall having rearwardly facing discharge outlets therein; and tubular structure communicating with said discharge outlets for discharging a substance into the subsoil behind said rear wall, said rear wall including an upper rearwardly projecting overhanging portion and a lower forwardly disposed undercut portion to define a lower transverse recess under the overhanging portion across the rear of the applicator, said discharge outlets being located in said undercut portion.

7. A subsoil applicator comprising:

an upright shank having a leading, generally upright edge and a pair of opposite sides extending rearwardly from said leading edge;

a pair of wings adjacent the lower end of said shank projecting laterally outwardly from opposite sides of the shank, said wings presenting a pair of laterally outermost edges that diverge rearwardly from the leading edge of the shank to a rearwardly facing rear wall extending across the rear of the applicator and interconnecting said outermost edges of the wings, said rear wall having rearwardly facing discharge outlets therein; and tubular structure communicating with said discharge outlets for discharging a substance into the subsoil behind said rear wall, said shank further including a generally upright rear edge, said tubular structure further including an upright, internal passage in said shank forward of said rear edge and communicating with said discharge outlets.

8. A subsoil applicator as claimed in claim 7, said rear wall including an upper overhanging portion and a lower undercut portion to define a lower transverse recess across the rear of the applicator, said discharge outlets being located in said undercut portion.

9. A subsoil applicator as claimed in claim 6, each of said wings having an upwardly projecting boss extending along and disposed forwardly adjacent said rear wall, said boss having a generally upwardly facing, convex upper surface that extends outwardly from the corresponding side of the shank to the outermost edge of the corresponding wing.

* * * * *